3,152,141
3-(2-PROPYNYL)-2-OXAZOLIDINONE COMPOUNDS
William F. Tousignant, Elm Grove, Wis., assignor to The Dow Chemical Company, Midland, Mich., a corporation of Delaware
No Drawing. Filed Nov. 29, 1963, Ser. No. 327,039
3 Claims. (Cl. 260—307)

The present invention is concerned with organic chemistry and is particularly directed to novel 5-loweralkyl-3-(2-propynyl) 2-oxazolidinones. The present compounds are of the formula

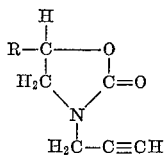

wherein R represents hydrogen or loweralkyl. Loweralkyl is herein defined as an alkyl group of from 1 to 4, both inclusive, carbon atoms.

The compounds are solids at ordinary temperatures, colorless in individual crystals, and white in mass. The compounds are soluble to various degrees in water, readily soluble in loweralkanols, dioxane, chloroform, and of generally low solubility in aromatic and aliphatic hydrocarbons. The compounds are useful as corrosion inhibitors for ferrous metals susceptible of corrosion by the corrosive substances normally present in brines, oils, and the like.

Also, the substances are useful as rodenticides. Further, the substances have useful properties for the kill of Entomostraca, such as water fleas (*Daphnia longispina*) and as a herbicide for monocotyledonous and dicotyledonous terrestrial plants as well as for aquatic vegetation of a wide variety.

The present compounds are prepared by reacting an N-alkali metal-(5-loweralkyl) - 2 - oxazolidinone with a propargyl halide whereof the halogen has an atomic weight greater than about 20. The reaction is caused by contacting the reactants with one another in liquid reaction medium which can be diethyl ether. Alkali metal halide of reaction is fromed. The resulting products are separated and purified in known manner as, for example, by fractional vacuum distillation.

The following examples illustrate the best methods now known to the inventor to prepare the present compounds.

*Example 1*

Into a 500 milliliter reaction flask fitted with condenser, stirrer, thermometer, and dropping funnel is placed 150 milliliters diethyl ether. In the ether is then suspended 27.5 grams (0.25 mole) 3-sodio-5-methyl-2-oxazolidinone. The resulting mixture is heated to the temperature of reflux, and thereto is added dropwise, with stirring, 30 grams (0.25 mole) propargyl bromide, the addition taking place during 15 minutes. At the conclusion of the time of addition, heating at the reflux temperature of the resulting reaction mixture is continued, with stirring, for an additional 8 hours. At the end of this time, the resulting mixture is permitted to cool to room temperature, and filtered (to remove by-product sodium bromide) and obtain an ether solution of the desired compound. The separated sodium bromide is assayed and found to weigh 23.5 grams, corresponding to an 81 percent conversion of the propargyl bromide.

The organic solution is warmed to vaporize and remove diethyl ether, and obtain 101.5 grams semi-crystalline oily semi-solid product. Upon a crude basis, this corresponds to approximately a 73 percent yield. This oily product is then vacuum distilled and a fraction boiling at 89° C. under a pressure of 0.20 millimeter mercury absolute is segregated, and recrystallized from an alcohol/water mixture to obtain the desired product as a crystalline solid. The product melts at 35–36° C. and is assayed at approximately 99 percent purity. Upon infrared spectrum analysis, it yields a distinctive spectrum which confirms the identity of the product.

*Example 2*

Into a reaction flask is placed 800 milliliters diethyl ether. In this ether there is suspended 109 grams (1 mole) 3-sodio-2-oxazolidinone. The resulting mixture is heated to the reflux temperature and stirred, and as stirring at the reflux temperature continues there are added, dropwise, slowly, and during approximately 2 hours, 120 grams (1 mole) of propargyl bromide. At the conclusion of the period of addition of the propargyl bromide, the resulting reaction mixture is heated for an additional 24 hours at its reflux temperature. At the end of this time, the reaction mixture is filtered, the residue being essentially sodium bromide. Assay of the sodium bromide corresponds to a 30 percent conversion of supplied propargyl bromide.

From the filtrate, ether is vaporized and removed by gentle warming. As a result of these procedures there is obtained an oily liquid 3-(2-propynyl) 2-oxazolidinone product boiling at 68–69° C., under a pressure of 0.39–0.40 millimeter mercury, absolute. The product, when analyzed by infrared spectroscopy, yields a definitive spectrum, and the assigned structure is confirmed.

In manners similar to the foregoing, employing N-alkali metal-5-ethyl-2-oxazolidinone and propargyl bromide there is obtained a 5-ethyl-3-(2-propynyl) 2-oxazolidinone compound. Also, by employing a N-sodio-5-n-propyl-2-oxazolidinone and propargyl iodine, there is obtained a 5-n-propyl-3-(2-propynyl) 2 - oxazolidinone. In similar manner, the other compounds of the present invention are prepared.

Representative of the utility of the present compounds, 5-methyl-3-(2-propynyl) 2-oxazolidinone was employed in the protection of sheet steel from corrosion by aqueous hydrochloric acid. More particularly, five corrosion tests were initiated, in each of which a sample of sheet steel was exposed for 16 hours to the action of 15 percent hydrochloric acid at 200° F. Of the five samples, four were modified by the addition thereto of 0.4 percent of the said oxazolidinone compound by weight of hydrochloric acid. The fifth was unmodified. No other inhibitor against the corrosive action of the acid was employed, and all samples of sheet steel were from the same original piece, and were essentially identical. All samples of acid were from the same batch. The test was carried out under conditions known from prior experience to be essentially standardized as to temperature and corrosion rate.

At the end of 16 hours, all samples of sheet steel were removed from their respective baths, dried, and weighed to ascertain loss in weight due to corrosion; loss in weight was expressed as pounds loss in weight per square foot area per 24 hours day. Upon this basis, the unhibited check sample represented a loss of one pound of steel per square foot per day. The four samples representing the inhibiting action of the said oxazolidinone showed losses, calculated as hitherto stated, of 0.053, 0.052, 0.033 and 0.031, respectively. Thus the corrosion in the acid bath inhibited by the employment of the present compound represented a loss of $\frac{1}{20}$, or less, that of the uninhibited check.

Similarly, the same compound was tested for protection of sheet steel, representative of oil well equipment such as casings and the like from corrosive attack by a synthetic mixture representative of a sour brine (90 percent) and crude oil (10 percent), by weight. The inclusion of 50 parts of the present compound per million parts by weight of the said synthetic sour brine and oil mixture resulted in a reduction of corrosion by 40 percent. When the test was repeated, the reduction of corrosion was 44 percent.

The test was twice rerun, employing 25 parts of the said compound per million parts of the synthetic sour brine and corrosion was reduced by 30 percent and 28 percent, respectively, as compared with the corrosion loss of a check uninhibited sample of the same synthetic sour brine and oil mixture in contact with a further sample of the same sheet steel.

I claim:
1. Compound of the formula

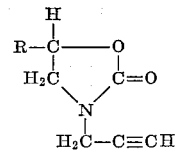

wherein R represents a loweralkyl radical, such radical being herein defined as a loweralkyl radical of from 1 to 4, both inclusive, carbon atoms.

2. 5-methyl-3-(2-propynyl) 2-oxazolidinone.
3. 3-(2-propynyl) 2-oxazolidinone.

No references cited.